US009210118B2

(12) United States Patent
Stremel et al.

(10) Patent No.: US 9,210,118 B2
(45) Date of Patent: *Dec. 8, 2015

(54) AUTOMATICALLY PROVIDING A COMMUNICATION BASED ON LOCATION INFORMATION FOR A USER OF A SOCIAL NETWORKING SYSTEM

(71) Applicant: Facebook, Inc., Menlo Park, CA (US)

(72) Inventors: Jed Stremel, Palo Alto, CA (US); Thyagarajapuram S. Ramakrishnan, Saratoga, CA (US); Mark Slee, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,154

(22) Filed: Mar. 20, 2014

(65) Prior Publication Data

US 2014/0207886 A1 Jul. 24, 2014

Related U.S. Application Data

(63) Continuation of application No. 13/618,856, filed on Sep. 14, 2012, now Pat. No. 8,719,346, which is a continuation of application No. 12/875,977, filed on Sep. 3, 2010, now Pat. No. 8,312,112, which is a continuation of application No. 11/713,455, filed on Feb. 28, 2007, now Pat. No. 7,809,805.

(51) Int. Cl.
*G06F 15/16* (2006.01)
*H04L 12/58* (2006.01)
(Continued)

(52) U.S. Cl.
CPC ............... *H04L 51/32* (2013.01); *G06Q 20/20* (2013.01); *G06Q 30/0633* (2013.01);
(Continued)

(58) Field of Classification Search
CPC ...................................................... H04L 61/24

USPC .................................................. 709/204, 206
See application file for complete search history.

(56) References Cited

U.S. PATENT DOCUMENTS 5,937,413 A    8/1999   Hyun
6,029,141 A    2/2000   Bezos
(Continued)

FOREIGN PATENT DOCUMENTS

EP    1 689 136    8/2006
JP    2008-517402 A    5/2008
(Continued)

OTHER PUBLICATIONS

United States Office Action, U.S. Appl. No. 12/574,614, Oct. 3, 2014, 24 pages.
(Continued)

*Primary Examiner* — Jude Jean Gilles
(74) *Attorney, Agent, or Firm* — Fenwick & West LLP

(57) ABSTRACT

Systems and methods for automatically locating web-based social network members are provided. According to one embodiment, contact content including an associated GPS identifier and status for web-based social network members located at or near the same location automatically appears on a GPS-enabled device. A further exemplary system includes a GPS-enabled device configured to receive a GPS identifier and a status representing a location and a current state for a web-based social network member, a processing module that associates the received GPS-identifier and the received status, and a communications module that sends the associated GPS-identifier and status to a server comprising a web-based social network database. Contact content in a web-based social network database record in the web-based social network database is updated to include the associated GPS identifier and status for the web-based social network member.

20 Claims, 5 Drawing Sheets

(51) Int. Cl.
*G06Q 20/20* (2012.01)
*G06Q 30/06* (2012.01)
*G06Q 50/00* (2012.01)
*H04L 29/06* (2006.01)
*H04W 4/02* (2009.01)
*H04W 4/20* (2009.01)
*H04L 29/08* (2006.01)
*H04W 4/18* (2009.01)

(52) U.S. Cl.
CPC ............. *G06Q 50/01* (2013.01); *H04L 29/06* (2013.01); *H04L 51/20* (2013.01); *H04L 67/02* (2013.01); *H04L 67/18* (2013.01); *H04L 67/24* (2013.01); *H04L 67/306* (2013.01); *H04W 4/02* (2013.01); *H04W 4/023* (2013.01); *H04W 4/206* (2013.01); *H04W 4/185* (2013.01)

(56) References Cited

U.S. PATENT DOCUMENTS

| | | |
|---|---|---|
| 6,681,108 B1 | 1/2004 | Terry et al. |
| 7,013,292 B1 | 3/2006 | Hsu |
| 7,249,123 B2 | 7/2007 | Elder et al. |
| 7,269,590 B2 | 9/2007 | Hull et al. |
| 7,359,894 B1 | 4/2008 | Liebman et al. |
| 7,363,024 B2 | 4/2008 | Jenkins |
| 7,529,723 B2 | 5/2009 | Howard et al. |
| 7,593,740 B2 | 9/2009 | Crowley et al. |
| 7,599,935 B2 | 10/2009 | La Rotonda et al. |
| 7,603,292 B1* | 10/2009 | Bragg et al. ............... 705/26.35 |
| 7,613,769 B1* | 11/2009 | Hess ......................... 709/203 |
| 7,693,752 B2 | 4/2010 | Jaramillo |
| 7,693,953 B2 | 4/2010 | Middleton et al. |
| 7,729,709 B1 | 6/2010 | Loeb et al. |
| 7,747,648 B1 | 6/2010 | Kraft et al. |
| 7,809,805 B2 | 10/2010 | Stremel et al. |
| 7,813,743 B1 | 10/2010 | Loeb et al. |
| 7,856,360 B2 | 12/2010 | Kramer et al. |
| 7,917,154 B2 | 3/2011 | Fortescue et al. |
| 7,937,336 B1 | 5/2011 | Maynard-Zhang et al. |
| 7,999,728 B2 | 8/2011 | Chen et al. |
| 8,005,906 B2 | 8/2011 | Hayashi et al. |
| 8,005,911 B2 | 8/2011 | Jhanji |
| 8,015,019 B1* | 9/2011 | Smith et al. ................ 705/1.1 |
| 8,019,692 B2 | 9/2011 | Rosen |
| 8,046,004 B2 | 10/2011 | Tsuchiya |
| 8,060,405 B1* | 11/2011 | Lawrence ................. 705/14.54 |
| 8,108,414 B2 | 1/2012 | Stackpole |
| 8,108,501 B2 | 1/2012 | Birnie et al. |
| 8,122,137 B2 | 2/2012 | Appelman et al. |
| 8,229,454 B1 | 7/2012 | Yoakum |
| 8,229,458 B2 | 7/2012 | Busch |
| 8,260,266 B1 | 9/2012 | Amidon et al. |
| 8,260,315 B2 | 9/2012 | Fortescu et al. |
| 8,290,513 B2 | 10/2012 | Forstall et al. |
| 8,296,281 B2 | 10/2012 | Baker et al. |
| 8,296,660 B2 | 10/2012 | Macadaan et al. |
| 8,312,112 B2 | 11/2012 | Stremel et al. |
| 8,392,500 B2 | 3/2013 | Macwan |
| 8,412,780 B2* | 4/2013 | Fox et al. ................... 709/206 |
| 8,457,084 B2 | 6/2013 | Valmikam et al. |
| 8,621,215 B1* | 12/2013 | Iyer .......................... 713/169 |
| 8,666,376 B2 | 3/2014 | Ramer et al. |
| 8,832,132 B1* | 9/2014 | Spertus et al. ............. 707/765 |
| 2001/0037721 A1 | 11/2001 | Hasegawa et al. |
| 2002/0059201 A1 | 5/2002 | Work |
| 2003/0061211 A1 | 3/2003 | Shultz et al. |
| 2003/0145093 A1 | 7/2003 | Oren |
| 2003/0222918 A1 | 12/2003 | Coulthard |
| 2003/0225632 A1 | 12/2003 | Tong et al. |
| 2004/0024846 A1 | 2/2004 | Randall et al. |
| 2004/0088177 A1 | 5/2004 | Travis et al. |
| 2004/0137882 A1 | 7/2004 | Forsyth |
| 2004/0148275 A1 | 7/2004 | Achlioptas |
| 2004/0192339 A1 | 9/2004 | Wilson et al. |
| 2004/0203759 A1 | 10/2004 | Shaw et al. |
| 2005/0021750 A1 | 1/2005 | Abrams |
| 2005/0038876 A1 | 2/2005 | Chaudhuri |
| 2005/0114759 A1 | 5/2005 | Williams et al. |
| 2005/0136988 A1 | 6/2005 | Villamil et al. |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171955 A1 | 8/2005 | Hull et al. |
| 2005/0177385 A1 | 8/2005 | Hull et al. |
| 2005/0197846 A1 | 9/2005 | Pezaris et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203807 A1 | 9/2005 | Bezos et al. |
| 2005/0216300 A1 | 9/2005 | Appelman et al. |
| 2005/0216550 A1 | 9/2005 | Paseman et al. |
| 2005/0235062 A1 | 10/2005 | Lunt et al. |
| 2005/0256756 A1 | 11/2005 | Lam et al. |
| 2005/0279820 A1 | 12/2005 | Moynihan et al. |
| 2006/0026513 A1 | 2/2006 | Eschbach et al. |
| 2006/0041543 A1 | 2/2006 | Achlioptas |
| 2006/0042483 A1 | 3/2006 | Work et al. |
| 2006/0048059 A1 | 3/2006 | Etkin |
| 2006/0052091 A1 | 3/2006 | Onyon et al. |
| 2006/0080613 A1 | 4/2006 | Savant |
| 2006/0085419 A1 | 4/2006 | Rosen |
| 2006/0111967 A1 | 5/2006 | Forbes |
| 2006/0136419 A1 | 6/2006 | Brydon |
| 2006/0143183 A1 | 6/2006 | Goldberg et al. |
| 2006/0161599 A1 | 7/2006 | Rosen |
| 2006/0174203 A1 | 8/2006 | Jung et al. |
| 2006/0184617 A1 | 8/2006 | Nicholas et al. |
| 2006/0190281 A1 | 8/2006 | Kott et al. |
| 2006/0194186 A1 | 8/2006 | Nanda |
| 2006/0218225 A1 | 9/2006 | Hee Voon et al. |
| 2006/0224675 A1* | 10/2006 | Fox et al. .................. 709/206 |
| 2006/0229058 A1 | 10/2006 | Rosenberg |
| 2006/0229063 A1 | 10/2006 | Koch |
| 2006/0230061 A1 | 10/2006 | Sample et al. |
| 2006/0247940 A1 | 11/2006 | Zhu et al. |
| 2006/0248573 A1 | 11/2006 | Pannu |
| 2006/0256008 A1 | 11/2006 | Rosenberg |
| 2006/0258368 A1 | 11/2006 | Granito et al. |
| 2006/0265227 A1 | 11/2006 | Sadamura |
| 2006/0270419 A1 | 11/2006 | Crowley et al. |
| 2006/0293976 A1 | 12/2006 | Nam |
| 2007/0030824 A1 | 2/2007 | Ribaudo et al. |
| 2007/0162228 A1 | 7/2007 | Mitchell |
| 2007/0167174 A1 | 7/2007 | Halcrow et al. |
| 2007/0174389 A1 | 7/2007 | Armstrong |
| 2007/0208916 A1 | 9/2007 | Tomita |
| 2007/0255785 A1 | 11/2007 | Hayashi et al. |
| 2007/0264974 A1 | 11/2007 | Frank et al. |
| 2007/0281689 A1 | 12/2007 | Altman et al. |
| 2007/0281690 A1 | 12/2007 | Altman et al. |
| 2007/0281716 A1 | 12/2007 | Altman et al. |
| 2007/0282678 A1 | 12/2007 | Dendi et al. |
| 2007/0282987 A1 | 12/2007 | Fischer |
| 2008/0005076 A1 | 1/2008 | Payne |
| 2008/0010343 A1 | 1/2008 | Escaffi et al. |
| 2008/0033776 A1 | 2/2008 | Marchese |
| 2008/0040428 A1 | 2/2008 | Wei et al. |
| 2008/0070593 A1 | 3/2008 | Altman et al. |
| 2008/0070697 A1 | 3/2008 | Robinson |
| 2008/0076418 A1 | 3/2008 | Beyer, Jr. |
| 2008/0086458 A1 | 4/2008 | Robinson |
| 2008/0102856 A1 | 5/2008 | Fortescue et al. |
| 2008/0104227 A1 | 5/2008 | Birnie et al. |
| 2008/0104679 A1 | 5/2008 | Craig |
| 2008/0132243 A1 | 6/2008 | Spalink et al. |
| 2008/0134030 A1 | 6/2008 | Kansal et al. |
| 2008/0151843 A1 | 6/2008 | Valmikam et al. |
| 2008/0188261 A1 | 8/2008 | Arnone |
| 2008/0189112 A1* | 8/2008 | Cohen et al. ............... 704/260 |
| 2008/0209339 A1 | 8/2008 | Macadaan et al. |
| 2008/0209340 A1 | 8/2008 | Tonse et al. |
| 2008/0209343 A1 | 8/2008 | Macadaan et al. |

(56) References Cited

U.S. PATENT DOCUMENTS

| | | | |
|---|---|---|---|
| 2008/0209349 | A1 | 8/2008 | Macadaan et al. |
| 2008/0209350 | A1 | 8/2008 | Sobotka et al. |
| 2008/0209351 | A1 | 8/2008 | Macadaan et al. |
| 2009/0005076 | A1 | 1/2009 | Forstall et al. |
| 2009/0031232 | A1 | 1/2009 | Brezina et al. |
| 2009/0125521 | A1 | 5/2009 | Petty |
| 2009/0177644 | A1 | 7/2009 | Martinez et al. |
| 2009/0204601 | A1 | 8/2009 | Grasset |
| 2009/0210480 | A1 | 8/2009 | Sivasubramaniam et al. |
| 2009/0215469 | A1 | 8/2009 | Fisher et al. |
| 2009/0291672 | A1 | 11/2009 | Treves et al. |
| 2010/0017289 | A1 | 1/2010 | Sah et al. |
| 2010/0088023 | A1 | 4/2010 | Werner |
| 2010/0122174 | A1 | 5/2010 | Snibbe et al. |
| 2010/0130233 | A1 | 5/2010 | Parker |
| 2010/0171763 | A1 | 7/2010 | Bhatt et al. |
| 2010/0180211 | A1 | 7/2010 | Boyd |
| 2010/0283676 | A1 | 11/2010 | Hatami et al. |
| 2011/0029538 | A1 | 2/2011 | Harple et al. |
| 2011/0047182 | A1 | 2/2011 | Shepherd et al. |
| 2011/0047471 | A1 | 2/2011 | Lord et al. |
| 2011/0197152 | A1 | 8/2011 | Assadollahi |
| 2012/0089623 | A1 | 4/2012 | Sobotka et al. |
| 2013/0073966 | A1 | 3/2013 | Appelman et al. |
| 2013/0073967 | A1 | 3/2013 | Appelman et al. |

FOREIGN PATENT DOCUMENTS

| | | |
|---|---|---|
| JP | 2010-520540 A | 6/2010 |
| WO | WO 2006/034384 A1 | 3/2006 |
| WO | WO 2006/044939 A2 | 4/2006 |
| WO | WO 2008/105766 A1 | 9/2008 |
| WO | WO 2009/108703 | 9/2009 |
| WO | WO 2010/006062 A1 | 1/2010 |

OTHER PUBLICATIONS

United States Patent and Trademark Office, Final Rejection, U.S. Appl. No. 12/574,614, Nov. 16, 2012, 19 Pages.
United States Patent and Trademark Office, Non-Final Rejection, U.S. Appl. No. 13/619,295, Nov. 27, 2012, 7 Pages.
United States Office Action, U.S. Appl. No. 12/574,614, Apr. 2, 2013, seventeen pages.
United States Office Action, U.S. Appl. No. 13/706,650, Apr. 18, 2013, eleven pages.
State Intellectual Property Office of the People's Republic of China, Notification of Board Opinion, Chinese Patent Application No. 200780051830.5, Aug. 29, 2013, eight pages.
United States Office Action, U.S. Appl. No. 12/574,614, Sep. 20, 2013, twenty pages.
Japanese Patent Office, Office Action, Japanese Patent Application No. 2009-551974, Jun. 25, 2013, four pages.
State Intellectual Property Office of the People's Republic of China, First Office Action, Patent Application No. 2007-80051830.5, Jan. 27, 2011, nine pages.
PCT International Search Report and Written Opinion, PCT Application No. PCT/US2010/038024, Aug. 5, 2010, seven pages.
PCT International Search Report and Written Opinion, PCT Application No. PCT/US2010/050363, Nov. 19, 2010, seven pages.
U.S. Office Action, U.S. Appl. No. 12/574,614, Apr. 9, 2012, sixteen pages.
European Patent Office, Examination Report, European Patent Application No. EP 07752069.0, Apr. 16, 2012, five pages.
European Patent Office, Supplementary European Search Report and Opinion, European Patent Application No. EP 07752069.0, Apr. 8, 2010, seven pages.
State Intellectual Property Office of the People's Republic of China, Rejection Decision, Patent Application No. 2007-80051830.5, Jan. 29, 2012, seven pages.
Japanese Patent Office, Notice of Grounds for Rejection, Japanese Patent Application No. P2009-551974, Jul. 31, 2012, 6 pages. (with English translation).
Flores, Fernando et al. "Computer systems and the design of organizational interaction." In ACM Transactions on Information Systems (TOIS), vol. 6, Issue 2, Apr. 1988.
Chipin. ChipIn: The easy way to collect money [online], Dec. 15, 2006 http://web.archive.org/web/20061215090739/www.chipin.com/overview.
Parzek, E. Social Networking to ChipIn to a Good Cause [online]. Business Design Studio, Jun. 29, 2006 http://www.businessdesignstudio.com/resources/blogger/2006/06social-networking-tochipin-to-good.html.
U.S. Appl. No. 11/639,655, Mark Zuckerberg, Systems and Methods for Social Mapping, filed Dec. 14, 2006.
U.S. Appl. No. 11/646,206, Aaron Sittig, Systems and Methods for Generating a Social Timeline, filed Dec. 26, 2006.
U.S. Appl. No. 11/493,291, Mark Zuckerberg, Systems and Methods for Dynamically Generating a Privacy Summary, filed Jul. 25, 2006.
U.S. Appl. No. 11/701,698, Jed Stremel, System and Method for Digital File Distribution, filed Feb. 2, 2007.
U.S. Appl. No. 11/701,566, Jed Stremel, System and Method for Automatic Population of a Contact File with Contact Content and Expression Content, filed Feb. 2, 2007.
U.S. Appl. No. 11/502,757, Andrew Bosworth, Systems and Methods for Generating Dynamic Relationship-Based Content Personalized for Members of a Web-Based Social Network, filed Aug. 11, 2006.
U.S. Appl. No. 11/503,093, Andrew Bosworth, Systems and Methods for Measuring User Affinity in a Social Network Environment, filed Aug. 11, 2006.
U.S. Appl. No. 11/503,037, Mark Zuckerberg, Systems and Methods for Providing Dynamically Selected Media Content to a User of an Electronic Device in a Social Network Environment, filed Aug. 11, 2006.
U.S. Appl. No. 11/503,242, Mark Zuckerberg, System and Method for Dynamically Providing a News Feed About a User of a Social Network, filed Aug. 11, 2006.
U.S. Appl. No. 11/499,093, Mark Zuckerberg, Systems and Methods for Dynamically Generating Segmented Community Flyers, filed Aug. 2, 2006.
U.S. Appl. No. 11/580,210, Mark Zuckerberg, System and Method for Tagging Digital Media, filed Oct. 11, 2006.
U.S. Appl. No. 11/893,493, Arieh Steinberg, Web-Based Social Network Badges, Aug. 15, 2007.
U.S. Appl. No. 11/982,974, Ruchi Sanghvi, Systems and Methods for a Web-Based Social Networking Environment Integrated Within One or More Computing and/or Networking Applications, filed Nov. 5, 2007.
U.S. Appl. No. 11/701,595, Ezra Callahan, System and Method for Determining a Trust Level in a Social Network Environment, filed Feb. 2, 2007.
U.S. Appl. No. 11/726,962, Charlie Cheever, System and Method for Confirming an Association in a Web-Based Social Network, filed Mar. 23, 2007.
U.S. Appl. No. 11/701,744, Andrew Bosworth, System and Method for Curtailing Objectionable Behavior in a Web-Based Social Network, filed Feb. 2, 2007.
U.S. Appl. No. 11/796,184, Jared S. Morgenstern, System and Method for Giving Gifts and Displaying Assets in a Social Network Environment, filed Apr. 27, 2007.
U.S. Appl. No. 11/893,797, Yun-Fang Juan, System and Method for Invitation Targeting in a Web-Based Social Network, filed Aug. 16, 2007.
U.S. Appl. No. 11/893,820, Yun-Fang Juan, Systems and Methods for Keyword Selection in a Web-Based Social Network, filed Aug. 16, 2007.
U.S. Appl. No. 11/899,426, Jared Morgenstern, System and Method for Collectively Giving Gifts in a Social Network Environment, filed Sep. 5, 2007.
U.S. Appl. No. 12/072,003, Arieh Steinberg, Systems and Methods for Implementation of a Structured Query Language Interface in a Distributed Database Environment, filed Feb. 21, 2008.
U.S. Appl. No. 12/077,070, Dave Fetterman, Systems and Methods for Network Authentication, filed Mar. 13, 2008.
U.S. Appl. No. 12/154,504, Adam D'Angelo, Personalized Platform for Accessing Internet Applications, filed May 23, 2008.

(56) References Cited

OTHER PUBLICATIONS

U.S. Appl. No. 12/156,091, Mark Zuckerberg, Systems and Methods for Auction-Based Polling, filed May 28, 2008.
U.S. Appl. No. 12/151,734, Jared Morgenstern, Systems and Methods for Classified Advertising in an Authenticated Web-Based Social Network, filed May 7, 2008.
U.S. Appl. No. 12/154,886, Nico Vera, Systems and Methods for Providing Privacy Settings for Applications Associated with a User Profile, filed May 27, 2008.
U.S. Appl. No. 60/965,624, Adam D'Angelo, Systems and Methods for Targeting Advertisements in a Social Network Environment, filed Aug. 20, 2007.
U.S. Appl. No. 11/893,559, Adam D'Angelo, Platform for Providing a Social Context to Software Applications, filed Aug. 15, 2007.
U.S. Appl. No. 60/967,842, Ezra Callahan, Systems and Methods for Dynamically Updating Privacy Settings, filed Sep. 7, 2007.
U.S. Appl. No. 60/966,442, Ezra Callahan, System and Method for Incorporating an Entity or Group other than a Natural Person into a Social Network, filed Aug. 28, 2007.
U.S. Appl. No. 60/965,852, Adam D'Angelo, Systems and Methods for Advertising, filed Aug. 22, 2007.
U.S. Appl. No. 61/005,614, Yishan Wong, Systems and Methods for Community Translations on a Web-Based Social Network, filed Dec. 5, 2007.
U.S. Appl. No. 12/080,808, Peter Deng, Systems and Methods for Calendaring, filed Apr. 2, 2008.

PCT International Search Report and Written Opinion, PCT/US2007/005343, Feb. 14, 2008, 9 Pages.
Supplementary European Search Report, European Patent Application No. EP 07752069.0, Apr. 8, 2010, 7 Pages.
U.S. Appl. No. 60/750,844, filed Dec. 14, 2005.
U.S. Appl. No. 60/753,810, filed Dec. 23, 2005.
U.S. Appl. No. 60/856,416, filed Nov. 3, 2006.
U.S. Appl. No. 60/899,121, filed Feb. 2, 2007.
United States Office Action, U.S. Appl. No. 13/618,856, Jul. 18, 2013, 10 pages.
United States Office Action, U.S. Appl. No. 13/618,856, Dec. 20, 2012, 6 pages.
United States Office Action, U.S. Appl. No. 12/875,977, Feb. 17, 2012, 8 pages.
United States Office Action, U.S. Appl. No. 11/713,455, Nov. 13, 2009, 11 pages.
United States Office Action, U.S. Appl. No. 11/713,455, Jul. 31, 2009, 11 pages.
United States Office Action, U.S. Appl. No. 11/713,455, Feb. 18, 2009, 9 pages.
United States Office Action, U.S. Appl. No. 13/706,650, Apr. 18, 2013, 11 pages.
State Intellectual Property Office of the People's Republic of China, Second Office Action, Chinese Application No. 200780051830.5, Jan. 7, 2015, seventeen pages.
State Intellectual Property Office of the People's Republic of China, Third Office Action, Chinese Patent Application No. 200780051830.5, Jun. 11, 2015, six pages.

* cited by examiner

AUTOMATICALLY PROVIDING A COMMUNICATION BASED ON LOCATION INFORMATION FOR A USER OF A SOCIAL NETWORKING SYSTEM

CROSS-REFERENCE TO RELATED APPLICATIONS

The present application is a continuation of U.S. patent application Ser. No. 13/618,856, filed on Sep. 14, 2012, which is in turn a continuation of U.S. patent application Ser. No. 12/875,977, filed on Sep. 3, 2010 and now U.S. Pat. No. 8,312,112, which is a continuation of U.S. patent application Ser. No. 11/713,455, filed on Feb. 28, 2007 and now U.S. Pat. No. 7,809,805. These applications are incorporated by reference herein in their entirety.

This application is also related to U.S. patent application Ser. No. 11/639,655 filed on Dec. 14, 2006 for "Systems and Methods for Social Mapping," which in turn claims the benefit and priority of U.S. Provisional Patent Application Ser. No. 60/750,844 filed on Dec. 14, 2005 for "Systems and Methods for Social Mapping," which are incorporated by reference herein in their entirety.

This application is also related to U.S. patent application Ser. No. 11/646,206 filed on Dec. 26, 2006 for "Systems and Methods for Social Timeline," which in turn claims the benefit and priority of U.S. Provisional Patent Application Ser. No. 60/753,810 filed on Dec. 23, 2005 for "Systems and Methods for Social Timeline," which are incorporated by reference herein in their entirety.

This application is also related to U.S. patent application Ser. No. 11/493,291 filed on Jul. 25, 2006 for "Systems and Methods for Dynamically Generating a Privacy Summary," which is incorporated by reference herein in its entirety.

This application is also related to U.S. patent application Ser. No. 11/499,093 filed on Aug. 2, 2006 for "Systems and Methods for Dynamically Generating Segmented Community Flyers," which is incorporated by reference herein in its entirety.

This application is also related to U.S. patent application Ser. No. 11/502,757 filed on Aug. 11, 2006 for "Systems and Methods for Generating Dynamic Relationship-Based Content Personalized for Members of a Web-Based Social Network," which is incorporated by reference herein in its entirety.

This application is also related to U.S. patent application Ser. No. 11/503,093 filed on Aug. 11, 2006 for "Systems and Methods for Measuring User Affinity in a Social Network Environment," which is incorporated by reference herein in its entirety.

This application is also related to U.S. patent application Ser. No. 11/503,037 filed on Aug. 11, 2006 for "Systems and Methods for Providing Dynamically Selected Media Content to a User of an Electronic Device in a Social Network Environment," which is incorporated by reference herein in its entirety.

This application is also related to U.S. patent application Ser. No. 11/503,242 filed on Aug. 11, 2006 for "System and Method for Dynamically Providing a News Feed About a User of a Social Network," which is incorporated by reference herein in its entirety.

This application is also related to U.S. patent application Ser. No. 11/580,210 filed on Oct. 11, 2006, for "System and Method for Tagging Digital Media," which is incorporated by reference herein in its entirety.

This application is also related to U.S. Provisional Patent Application Ser. No. 60/856,416 filed on Nov. 3, 2006 for "Systems and Methods for a Web-Based Social Networking Environment Integrated Within One or More Computing and/or Networking Applications," which is incorporated by reference herein in its entirety.

This application is also related to U.S. Provisional Patent Application Ser. No. 60/899,121 filed on Feb. 2, 2007 entitled "System and Method for Automatically Giving Gifts and Displaying Assets in a Social Network Environment," which is incorporated by reference herein in its entirety.

This application is also related to U.S. patent application Ser. No. 11/701,698 filed on Feb. 2, 2007 entitled "System and Method for Digital File Distribution," which is incorporated by reference herein in its entirety.

This application is also related to U.S. patent application Ser. No. 11/701,566 filed on Feb. 2, 2007 entitled "System and Method for Automatic Population of a Contact File with Contact Content and Expression Content," which is incorporated by reference herein in its entirety.

This application is also related to U.S. patent application Ser. No. 11/701,595 filed on Feb. 2, 2007 entitled "System and Method for Determining a Trust Level in a Social Network Environment," which is incorporated by reference herein in its entirety.

This application is also related to U.S. patent application Ser. No. 11/701,744 filed on Feb. 2, 2007 entitled "System and Method for Curtailing Objectionable Behavior in a Web-Based Social Network," which is incorporated by reference herein in its entirety.

BACKGROUND OF THE INVENTION

1. Field of the Invention

The present invention relates generally to web-based social networks, and more particularly to systems and methods for automatically locating web-based social network members.

2. Description of Related Art

Deciding whether to contact a particular friend, classmate, or coworker often hinges on where the person is located and what that person is doing. Such a decision typically has to be made in a limited amount of time with a limited amount of information. Further, when a person arrives at a particular location, such as a park or shopping mall, they often want to know if someone else they know is also at the same location. There is thus a need for systems and methods for automatically locating web-based social network members.

SUMMARY OF THE INVENTION

Systems and methods are provided for automatically locating web-based social network members. An exemplary method includes receiving a GPS identifier into a device, receiving a status into the device, associating the GPS identifier and the status, storing a copy of the associated GPS identifier and status in a contact file on the device, and sending the associated GPS identifier and status to a server comprising a web-based social network database. Another exemplary method includes receiving across a network on a server comprising a web-based social network database, an associated GPS identifier and status for a web-based social network member, updating contact content in a web-based social network database record in the web-based social network database with the associated GPS identifier and status for the web-based social network member, and providing the contact content to a communications module for sending across the network to a device having a contact file configured to automatically store the contact content.

An exemplary system according to one embodiment comprises a device with a GPS module configured to receive a GPS identifier, a status entry screen on the device configured to receive a status, a processing module on the device configured to associate the GPS identifier and the status, a contact file on the device configured to store a copy of the associated GPS identifier and status, and a communication module on the device configured to send the associated GPS identifier and status to a server comprising a web-based social network database.

Another exemplary system includes a server comprising a web-based social network database, the server configured to receive across a network an associated GPS identifier and status for a web-based social network member, the web-based social network database including a web-based social network database record for the web-based social network member, the web-based social network database record configured to update contact content with the associated GPS identifier, and the server further configured to provide the contact content to a communications module for sending across the network to a device having a contact file configured to automatically store the contact content.

DETAILED DESCRIPTION OF THE INVENTION

Systems and methods for automatically locating web-based social network members are provided. According to one embodiment, a GPS identifier is received on a GPS-enabled device that is used to query a web-based social network database. Contact content including an associated GPS identifier and status for other web-based social network members located at or near the same location automatically appears on the GPS-enabled device. A further exemplary system includes a GPS-enabled device configured to receive a GPS identifier and a status representing a location and a current state for a web-based social network member, a processing module that associates the received GPS-identifier and status, and a communications module that sends the associated GPS-identifier and status to a server comprising a web-based social network database. Contact content in a web-based social network database record in the web-based social network database is updated to include the associated GPS identifier and status for the web-based social network member.

Figure 1:
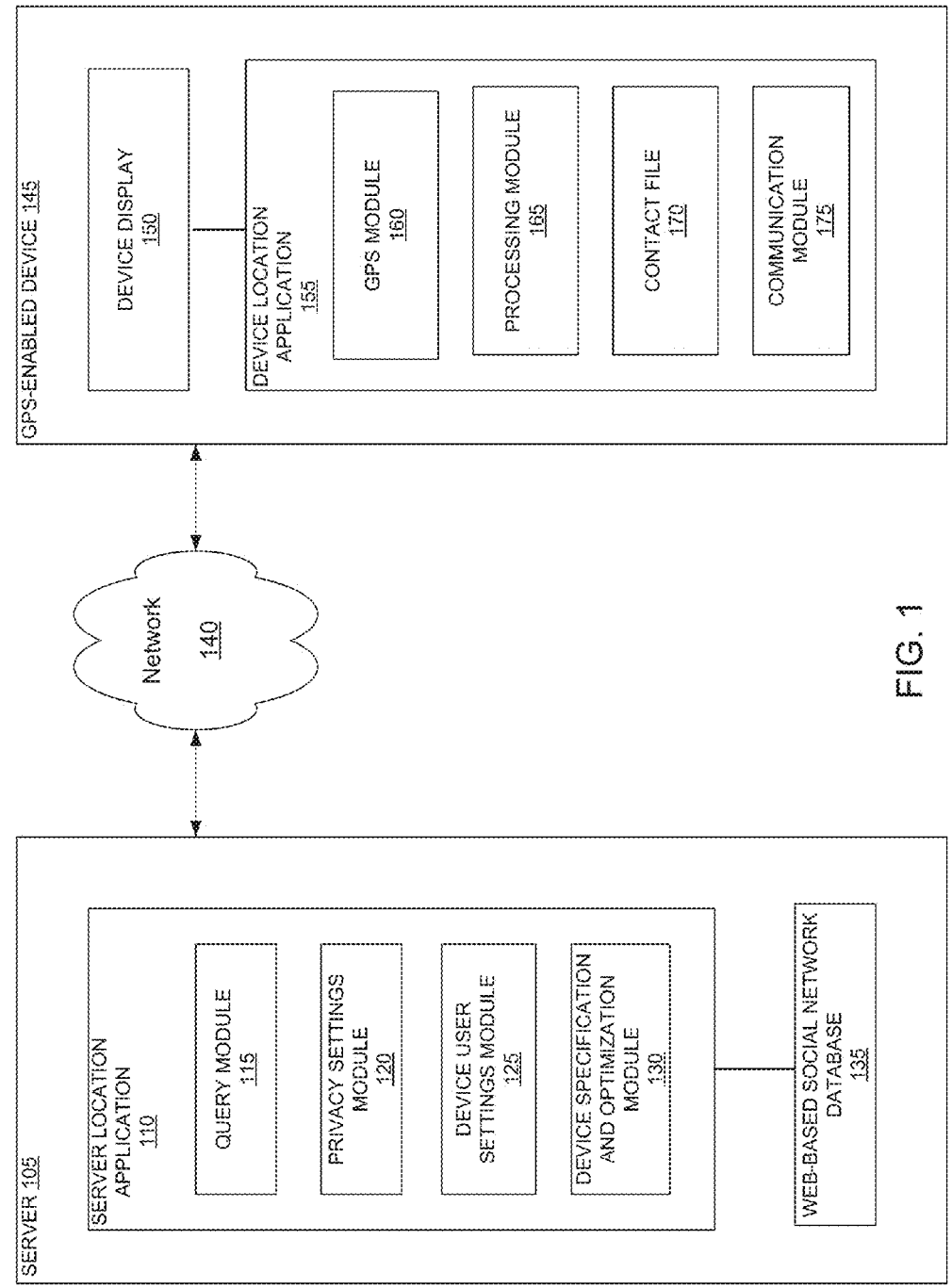
FIG. 1 illustrates an exemplary architecture for automatically locating web-based social network members.

FIG. 1 illustrates an exemplary architecture 100 for automatically locating web-based social network members. Architecture 100 comprises a server 105, a network 140, and a GPS-enabled device 145. Server 105 comprises a server location application 110 and a web-based social network database 135. Server location application 110 includes a query module 115, a privacy settings module 120, a device user settings module 125 and a device specification and optimization module 130. GPS-enabled device 145 comprises a device display 150, and a device location application 155. The device location application 155 includes a Global Positioning System ("GPS") module 160, a processing module 165, a contact file 170, and a communication module 175.

According to one method, a member of a web-based social network having a GPS-enabled device 145 receives a GPS identifier into GPS module 160. The GPS identifier may represent a current geographic location (e.g. street address) for the member of the web-based social network. For example, a GPS identifier may be received into GPS module 160 of GPS-enabled device 145 that indicates 123 Main Street, College Town, Calif. 90210 is a current geographic location for the member. Using a keypad, touch screen, or similar mechanism on the GPS-enabled device 145, the member may enter a status, which is received by the GPS-enabled device 145. The status represents a current state for the member at or near the time the GPS identifier is received into GPS module 160. A status may include an arbitrary designation such as "at home," "at work," "at doctor's office," and/or another similar arbitrary designation. A processing module 165 associates the received GPS identifier with the received status. For example, the processing module 165 might associate the received GPS identifier of 123 Main Street, College Town, Calif. 90210 with the received status of "at home." A copy of the associated GPS identifier and status is stored in contact file 170. A communication module 175 sends the associated GPS identifier and status to server 105, where it is received. The server 105 comprises a web-based social network database 135. The web-based social network database 135 comprises a social network database record 300 (FIG. 3) for each web-based social network member. Contact content in the web-based social network database record 300 is updated to include the associated GPS identifier and status. The updated web-based social network database record may be queried by other members of the web-based social network, subject to privacy settings, as described herein.

In an alternative method, instead of receiving a GPS identifier into GPS module 160, a web-based social network member may manually enter a street address on a keypad or touchscreen of a GPS-enabled device 145 or a non GPS-enabled device. The street address is received by the GPS-enabled device 145 or the non GPS-enabled device in a manner similar to the way a GPS identifier is received by a GPS-enabled device 145. When a corresponding status is received by the GPS-enabled device 145 or the non GPS-enabled device, processing module 165 associates the received street address with the received status. Contact file 170 stores a copy of the associated street address and status, and communication module 175 sends the associated street address and status to server 105.

In a further alternative method, the GPS identifier may include information utilizing or originating from one or more of several different types of technologies that provide either fully or partially location-based information, including, without limitation, network-based triangulation as well as hybrid approaches using various GPS networks.

In an exemplary system, processing module 165 is further configured to check contact file 170 for a corresponding status if a GPS identifier is received into GPS module 160 without a corresponding status. If a corresponding status is found, it will be displayed on device display 150. If a status corresponding to a received GPS identifier is not found in contact file 170, communication module 175 sends the received GPS identifier to server 105 without the status. Query module 115 on server 105 queries web-based social network database 135 for a status associated with the GPS identifier. If a status corresponding to the GPS identifier is found in the web-based social network database 135, it is sent from server 105 to GPS-enabled device 145. Processing module 165 associates the received GPS identifier with the status, and a copy of the associated GPS identifier and status is stored in contact file 170.

In a further exemplary method, a received GPS identifier is sent by communication module 175 to server 105, regardless of whether the received GPS identifier has an associated status in contact file 170 and/or in web-based social network database 135. In response, query module 115 on server 105 queries web-based social network database 135 for contact content of other members of the web-based social network having a matching or near matching GPS identifier in their web-based social network database records 300. If one or more other members of the web-based social network are determined to have a matching or near matching GPS identifier included on their web-based social network database records 300, contact content tier those other members is sent from server 105 to GPS-enabled device 145. As a result, the querying social network member learns about the other social network members located nearby.

In yet a further exemplary method, a received GPS identifier that does not have an associated status may be sent by communications module 175 to server 105, whereupon server 105 or an affiliated module may associate the GPS identifier with a status.

According to some embodiments, a privacy settings module 120 forms part of server location application 110. Based on privacy settings selected by a member of a web-based social network, privacy settings module 120 is configured to limit querying of certain associated GPS identifiers and statuses in web-based social network database 135. For example, in one embodiment, a member of a web-based social network may select privacy settings to provide their associated GPS identifier and status to only those people designated by the member as "friends" of the member.

The server location application 110 may comprise a device user settings module 125 for controlling such functions as when the server 105 communicates with the GPS-enabled device 145. For example, the device user settings module 125 can be set to direct the server 105 to communicate with the GPS-enabled device 145 during standard working hours. The device user settings module 125 can also be set to allow the server 105 to communicate with the GPS-enabled device 145 in response to certain changes in the web-based social network database 135. For example, the device user settings module 125 can be set to allow the server 105 to communicate with the GPS-enabled device 145 when a particular member of the web-based social network updates her associated GPS identifier and status in her web-based social network database record 300.

A device specification and optimization module 130 on the server location application 110 may be configured with specifications for a wide variety of GPS-enabled devices 145 communicating with the server 105. The device specification and optimization module 130 recognizes the type of GPS-enabled devices 145 being used to communicate with the server 105 and formats an associated GPS identifier and status to accommodate the specifications of the particular device 145. For example, the device specification and optimization module 130 may automatically recognize that a member of a web-based social network is using a BlackBerry™ device to communicate with the server 105. Accordingly, the device specification and optimization module 130 will format an associated GPS identifier and status sent to the device to accommodate the device display 150 of the BlackBerry™ device.

It will readily be appreciated by one of ordinary skill in the art that there are multiple possible combinations and locations for the herein described component applications and modules. For example, web-based social network database 135 may also function as part of server location application 110 and/or server 105, or as a standalone application, separate from server location application 110 and/or server 105. Further, a number of commonly known communications mechanisms can be used for a GPS-enabled device 145 to communicate with the server 105 across network 140. Network 140 may include an Internet network and/or other wireless or wired networks such as mobile device carrier networks. Further, GPS-enabled device 145 may also directly communicate with other devices similar to GPS-enabled device 145. All of these variations remain within the scope of claimed embodiments.

Figure 2:
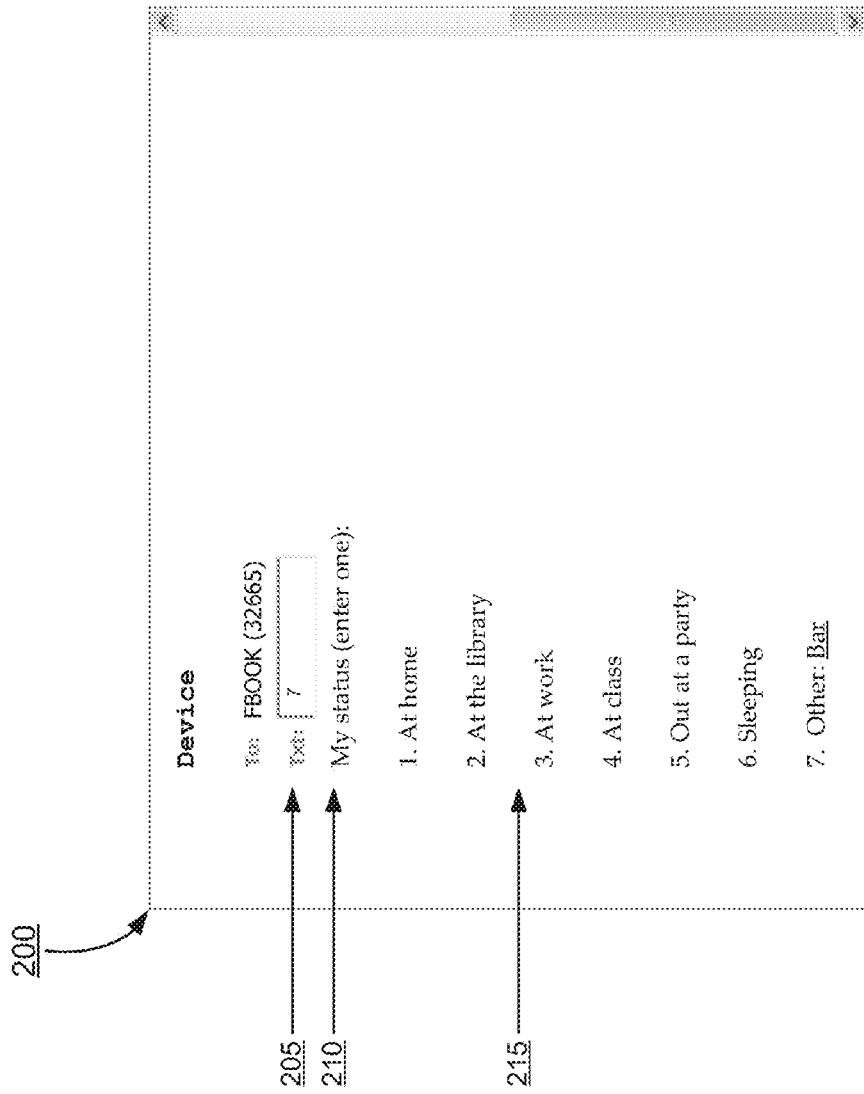
FIG. 2 shows a screenshot for an exemplary status screen used to transmit a status for a web-based social network member to a web-based social network database.

FIG. 2 shows a screenshot for an exemplary status screen 200. Exemplary status screen 200 is used to send a received status of a web-based social network member to a server comprising a web-based social network database 135 (FIG. 1). The exemplary status screen 200 includes a status entry box 205, instructions 210 and status selections 215. The status screen 200 typically appears on device display 150 (FIG. 1.).

A status for a web-based social network member is received in status entry box 205. According to one embodiment, the status may be received via manual entry by a web-based social network member on a keypad or on a touchscreen on a GPS-enabled device 130 (FIG. 1). In a further embodiment, a status may be received from another device that is the same as or similar to GPS-enabled device 145.

In the exemplary status screen 200, instructions 210 instruct a web-based social network member to select a status from seven arbitrary status selections 215. These selections include, "[a]t home," "[a]t the library," "[a]t work," "[a]t class," "[o]ut at a party," "sleeping," and/or "other." If the web-based social network member selects a status of "other," they may be prompted to type-in an arbitrary status to represent their current state. For example, a web-based social network member selecting a status of "other" by entering selection "7" into status entry box 205 is prompted to type-in "Bar." According to one embodiment, a GPS identifier received into GPS module 160 will be associated by processing module 165 with the received status of "Bar." For example, a GPS identifier received into GPS module 160 may be a street address of "123 Main Street, College Town, Calif., 90120." Accordingly, processing module 165 will associate "123 Main Street, College Town, Calif., 90120" with "Bar." A copy of the associated GPS identifier and status (i.e. "Bar, 123 Main Street, College Town, Calif., 90120") is stored in contact file 170, and communication module 175 sends the associated GPS identifier and status to server 105.

It will readily be appreciated by one of ordinary skill in the art that other status selections may be included in exemplary status screen 200 and remain within the scope of embodiments claimed herein.

Figure 3:
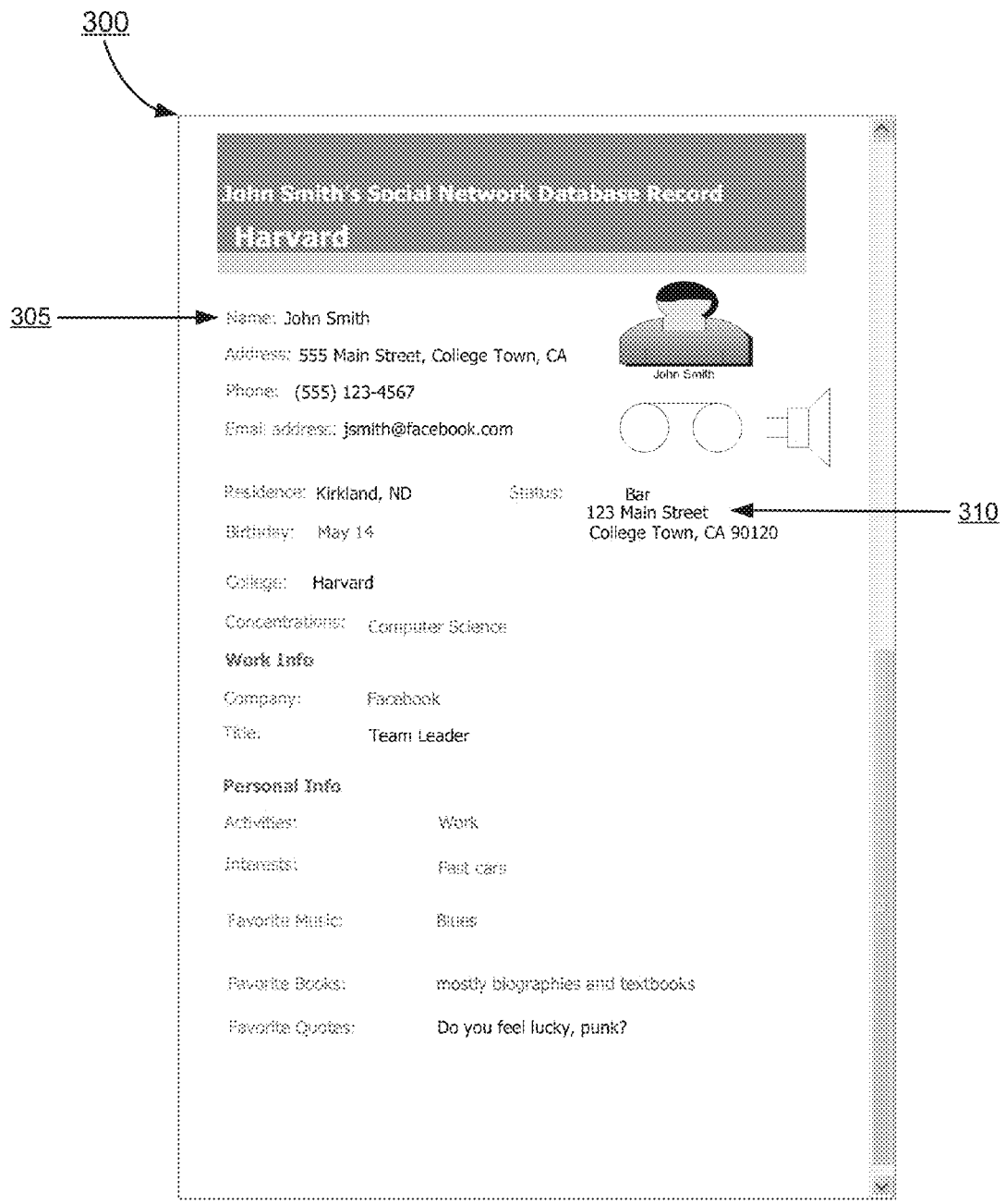
FIG. 3 shows a screenshot of an exemplary web-based social network database record.

FIG. 3 shows a screenshot of an exemplary web-based social network database record 300. The exemplary social network database record 300 is for John Smith of Harvard University. The social network database record 300 includes John Smith's contact content 305. According to various embodiments, contact content includes some or all information in web-based social network database 135. Contact content also includes expression content, such as audio/video. Audio/video is any audio, video, audiovisual, pictorial, photograph, image form, text file, and/or all variations and combinations thereof.

The contact content 305 shown in exemplary social network database record 300 includes John Smith's associated GPS identifier and status 310. In the social network database record 300, John Smith's associated GPS identifier and status 310 is "Bar, 123 Main Street, College Town, Calif. 90120."

Figure 4:
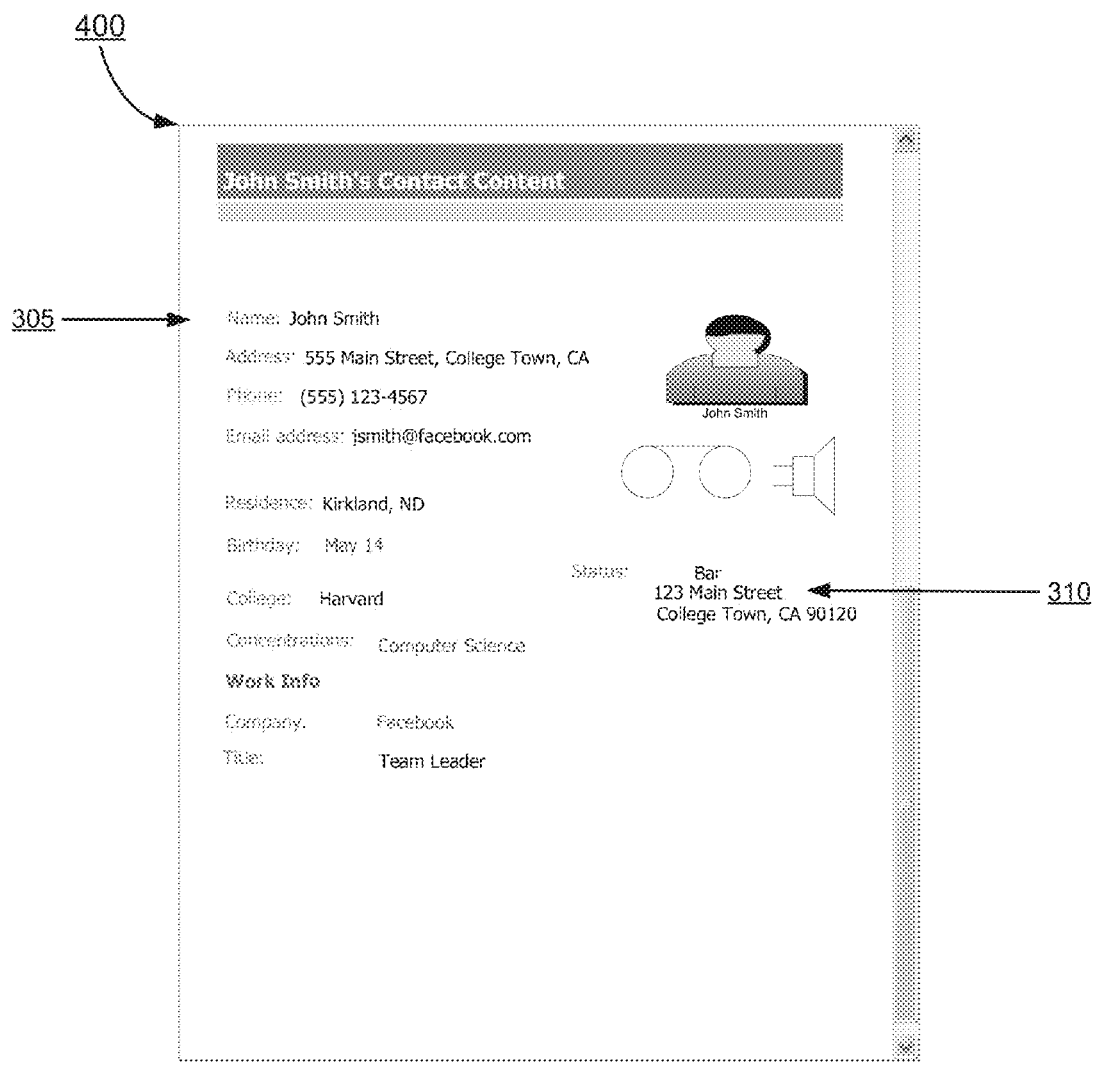
FIG. 4 shows a screenshot of an exemplary contact content screen.

FIG. 4 shows a screenshot of an exemplary contact content screen 400. A contact content screen such as contact content screen 400 is displayed on the device display 150 (FIG. 1) of the GPS-enabled device 145 (FIG. 1). A social network database record such as social network database record 300 (FIG. 3) is one possible source of some or all of the contact content appearing on a contact content screen, such as exemplary contact content screen 400.

The contact content screen 400 shown in FIG. 4 is for John Smith of Harvard University. The contact content screen 400 includes some or all of John Smith's contact content 305, which includes an associated GPS identifier and status 310 for John Smith.

According to some embodiments, some or all of the contact content on the contact content screen 400 automatically populates a contact file 170 (FIG. 1) on the GPS-enabled device 145, as described in U.S. patent application Ser. No. 11/701,566 filed on Feb. 2, 2007 entitled "System and Method for Automatic Population of a Contact File with Contact Content and Expression Content," and incorporated herein by reference.

According to further embodiments, after a GPS identifier is received into GPS module 160 of GPS-enabled device 145, communication module 175 sends the GPS identifier to server 105 (FIG. 1) to query web-based social network database 135 for corresponding contact content. If one or more other members of a web-based social network are determined to have a matching or near matching GPS identifier included in their web-based social network database records 300, contact content as seen in exemplary contact content screen 400 corresponding to those other members is sent from server 105 to GPS-enabled device 145. As a result, the querying social network member learns about the other social network members located nearby.

Figure 5:
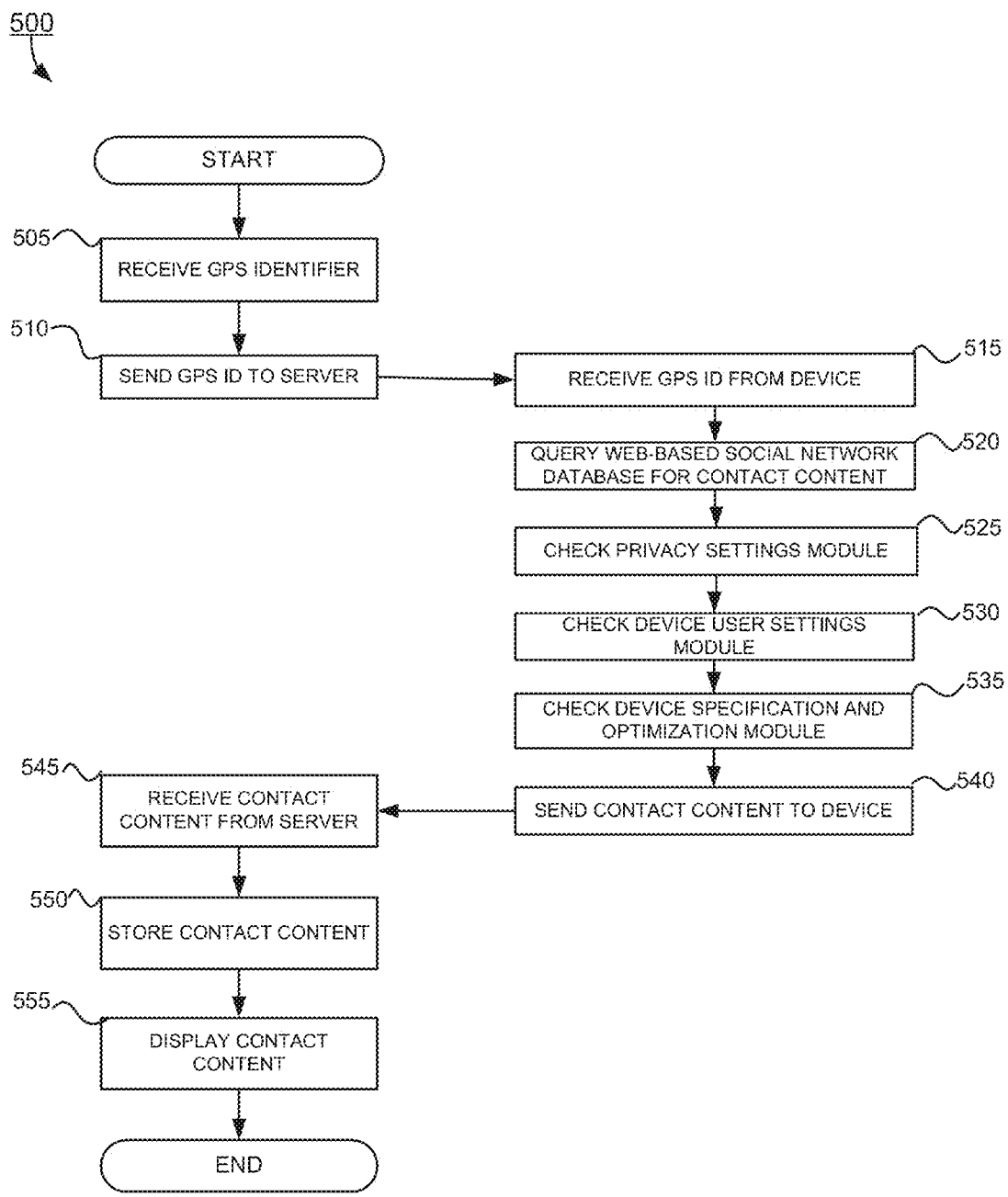
FIG. 5 shows a flow chart for an exemplary method for automatically locating a web-based social network member.

FIG. 5 shows a flow chart for an exemplary method 500 for automatically locating members of a web-based social network.

At step 505, GPS-enabled device 145 (FIG. 1) receives a GPS identifier into GPS module 160 FIG. 1). In exemplary embodiments, a GPS identifier represents a street address for a web-based social network member. In a further embodiment, a GPS identifier can be entered by a web-based social network member using a keypad or touchscreen on a GPS-enabled device 145, or on a keypad or touchscreen of a device that is not GPS-enabled.

At step 510, the GPS-enabled device 145 sends the GPS identifier to server 105 (FIG. 1). According to various embodiments, communication module 170 (FIG. 1) in GPS-enabled device 145 sends the GPS identifier to the server 105.

At step 515, server 105 receives the GPS identifier across network 140 (FIG. 1) from the GPS-enabled device 145. In some embodiments, network 140 may include an Internet network and/or other wireless or wired networks such as mobile device carrier networks.

At step 520, query module 115 (FIG. 1) on server 105 queries web-based social network database 135 (FIG. 1) for contact content (including an associated GPS identifier and status) of other web-based social network members having a GPS identifier that is the same as, or closely related to the received GPS identifier.

At step 525, server 105 checks a privacy settings module 120 (FIG. 1). According to one embodiment, the privacy settings module 120 is configured to limit contact content (including an associated GPS identifier and status) sent from server 105 to GPS-enabled device 145. In an alternative embodiment, a privacy settings module 120 is configured to limit querying of web-based social network database 135.

At step 530, server 105 checks a device user settings module 125 (FIG. 1). According to some embodiments, device user settings module 125 controls such functions as when server 105 communicates with GPS-enabled device 145. In a further embodiment, device user settings module 145 is configured to direct server 105 to communicate updated contact content (including an associated GPS identifier and status) to the GPS-enabled device 145 in response to certain changes in web-based social network database 135.

At step 535, server 105 checks a device specification and optimization module 130 (FIG. 1). According to one embodiment, the device specification and optimization module 130 is configured with specifications for a wide variety of GPS-enabled devices 145 communicating with server 105. Device specification and optimization module 130 recognizes the type of GPS-enabled device 145 being used to communicate with the server 105 and formats contact content to accommodate the specifications of the GPS-enabled device 145.

At step 540, contact content (including an associated GPS identifier and status for the other members of the web-based social network having the same or a closely related GPS identifier is sent from server 105 to GPS-enabled device 145. According to some embodiments, a number of commonly known communications mechanisms are used for server 105 to communicate across network 140 with GPS-enabled device 145.

At step 545, the GPS-enabled device 145 receives contact content including an associated GPS identifier and status) from the server 105.

At step 550, the contact content is automatically stored in contact file 170 (FIG. 1). According to one embodiment, a contact file 170 is a component of the device location application 155 (FIG. 1) on the GPS-enabled device 145.

At step 555, the contact content is displayed on device display 150 (FIG. 1) of GPS-enabled device 145.

While various embodiments have been described above, it should be understood that they have been presented by way of example only, and not limitation. For example, any of the elements associated with automatically locating web-based social network members may employ any of the desired functionality set forth hereinabove. Thus, the breadth and scope of a preferred embodiment should not be limited by any of the above-described exemplary embodiments.

What is claimed is:

1. A computer-implemented method comprising:
   receiving, by a social networking system, location information for a device associated with a first user of the social networking system and including a location identifier;
   determining a location name based on a location identifier;
   associating the location information with the first user in a user profile associated with the first user of the social networking system; and
   sending, from the social networking system to a second user, a communication generated based at least in part on the location information, the communication including the determined location name.

2. The computer-implemented method of claim 1, wherein the second user has a social networking connection to the first user over the social network system.

3. The computer-implemented method of claim 1, wherein associating the location information comprises storing the location information in the user profile associated with the first user.

4. The computer-implemented method of claim 1, wherein the communication generated based at least in part on the location information is a story providing information about the first user based at least in part on the location information.

5. The computer-implemented method of claim 1, wherein sending the communication generated based at least in part on the location information to the second user comprises:
   determining a physical address based at least in part on the location information; and
   sending at least the physical address to the second user.

6. The computer-implemented method of claim 1, wherein the communication generated based at least in part on the location information includes a video associated with the location information.

7. The computer-implemented method of claim 1, wherein the communication generated based at least in part on the location information includes audio associated with the location information.

8. The computer-implemented method of claim 1, wherein the communication generated based at least in part on the location information includes a photograph associated with the location information.

9. The computer-implemented method of claim 1, wherein the communication generated based at least in part on the location information provides information about a place at a geographic location represented by the location information.

10. A computer system, comprising:
a non-transitory computer-readable medium storing modules that include:
   a communication module configured to:
   receive location information for a device associated with a first user of a social networking system and including a location identifier,
   determine a location name based on a location identifier, and
   send, to a second user, a communication generated based at least in part on the location information; and
   a database module configured to associate the location information with the first user in a user profile associated with the first user of the social networking system; and
a processor to execute the modules.

11. The system of claim 10, wherein the second user has a social networking connection to the first user over the social network system.

12. The system of claim 10, wherein the communication generated based at least in part on the location information is a story providing information about the first user based at least in part on the location information.

13. The system of claim 10, wherein the communication module is configured to:
   determine a physical address based at least in part on the location information; and
   send at least the physical address to the second user.

14. The system of claim 10, wherein the communication generated based at least in part on the location information includes a video associated with the location information.

15. The system of claim 10, wherein the communication generated based at least in part on the location information includes audio associated with the location information.

16. The system of claim 10, wherein the communication generated based at least in part on the location information includes a photograph associated with the location information.

17. A non-transitory computer-readable storage medium storing instructions executable by a computer processor, the instructions comprising:
   instructions for receiving, by a social networking system, location information for a device associated with a first user of the social networking system and including a location identifier;
   instructions for determining a location name based on a location identifier;
   instructions for associating the location information with the first user in a user profile associated with the first user of the social networking system; and
   instructions for sending, from the social networking system to a second user, a communication generated based at least in part on the location information, the communication including the determined location name.

18. The non-transitory computer-readable storage medium of claim 17, wherein the second user has a social networking connection to the first user over the social network system.

19. The non-transitory computer-readable storage medium of claim 17, wherein associating the location information comprises storing the location information in the user profile associated with the first user.

20. The non-transitory computer-readable storage medium of claim 17, wherein the communication generated based at least in part on the location information is a story providing information about the first user based at least in part on the location information.

* * * * *